(12) United States Patent
Al-Joundi et al.

(10) Patent No.: US 12,020,037 B2
(45) Date of Patent: Jun. 25, 2024

(54) CENTRALIZED CONTROL OF LIGHTING-ENABLED PERIPHERAL DEVICES

(71) Applicant: MICROSOFT TECHNOLOGY LICENSING, LLC, Redmond, WA (US)

(72) Inventors: Connor Colin Marwan Al-Joundi, Seattle, WA (US); Eric Norman Badger, Redmond, WA (US); Tyler Duckworth, Redmond, WA (US); Stephanie Ling Diao, Seattle, WA (US); Emily Lynn Bender, Seattle, WA (US); Jerome Stephen Healy, Seattle, WA (US); Jan-Kristian Markiewicz, Redmond, WA (US); Sophia Sixue Chen, Chicago, IL (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 17 days.

(21) Appl. No.: 17/852,881

(22) Filed: Jun. 29, 2022

(65) Prior Publication Data
US 2024/0004671 A1 Jan. 4, 2024

(51) Int. Cl.
*G06F 9/4401* (2018.01)
*G06F 3/0484* (2022.01)
(Continued)

(52) U.S. Cl.
CPC .......... *G06F 9/4411* (2013.01); *G06F 3/0484* (2013.01); *H05B 47/155* (2020.01); *H05B 47/17* (2020.01); *H05B 47/18* (2020.01)

(58) Field of Classification Search
CPC ..... G06F 9/4411; G06F 3/0484; H05B 47/17; H05B 47/155; H05B 47/18
See application file for complete search history.

(56) References Cited

U.S. PATENT DOCUMENTS

| 7,802,246 B1 | 9/2010 | Kennedy et al. |
| 2006/0085606 A1* | 4/2006 | Su .................. G06F 13/404 |
| | | 711/146 |

(Continued)

FOREIGN PATENT DOCUMENTS

| CN | 113935052 A * | 1/2022 |
| WO | WO-2022195878 A1 * | 9/2022 |

OTHER PUBLICATIONS

Asus, "The Evolution of Aura RGB Lighting Leads to an Official SDK", Retrieved from: https://rog.asus.com/articles/technologies/the-evolution-of-aura-rgb-lighting-leads-to-an-official-sdk/, Jun. 16, 2017, 8 Pages. (Year: 2017).*

(Continued)

*Primary Examiner* — Henry Tsai
*Assistant Examiner* — John B Roche
(74) *Attorney, Agent, or Firm* — Newport IP, LLC; Jacob P. Rohwer

(57) ABSTRACT

The techniques disclosed herein implement a centralized lighting module configured to control a diverse set of lighting-enabled peripheral devices. The set of lighting-enabled peripheral devices is diverse with respect to a type and a manufacturer. The lighting module is referred to as a centralized lighting module because the lighting module is part of an operating system of a computing device. Consequently, a user of the computing device no longer has to download and learn to use multiple different lighting applications if the user wants to create a diverse lighting ecosystem in which lighting-enabled peripheral devices from different manufacturers are connected to the computing device. Similarly, a developer of a computing application no longer has to engage and interact with multiple application programming interfaces (APIs) and software development kits (Continued)

(SDKs) if the developer wants users of their computing application to be able to create a diverse lighting ecosystem.

18 Claims, 12 Drawing Sheets

(51) Int. Cl.
*H05B 47/155* (2020.01)
*H05B 47/17* (2020.01)
*H05B 47/18* (2020.01)

(56) References Cited

U.S. PATENT DOCUMENTS

| | | | | |
|---|---|---|---|---|
| 2009/0109345 A1* | 4/2009 | Nori | .................... | H04L 12/2803 348/E9.037 |
| 2016/0373944 A1* | 12/2016 | Jain | ..................... | H04M 3/2236 |
| 2020/0143125 A1* | 5/2020 | Mars | .................. | H04B 10/1149 |
| 2021/0263600 A1* | 8/2021 | Starrett | ............... | G06F 3/04845 |

OTHER PUBLICATIONS

WO-2022195878-A1 English translation (Year: 2022).*
CN-113935052-A English translation (Year: 2022).*
Crashniels, "[Guide] How to sync Asus Aura with ICue", Retrieved from: https://forum.corsair.com/forums/topic/145284-guide-how-to-sync-asus-aura-with-icue/, Sep. 4, 2018, 24 Pages.
"Asus Aura—Outshine The Competition", Retrieved from: https://www.asus.com/campaign/aura/global/, Retrieved on: Apr. 22, 2022, 6 Pages.
"Fluent Design System", Retrieved from: https://web.archive.org/web/20180626204505/https://www.microsoft.com/design/fluent/, Jun. 26, 2018, 5 Pages.
"How to configure Logitech Lightsync RGB lighting to match Your Screen", Retrieved from: https://www.youtube.com/watch?v=BVURMS2hgbl, Sep. 6, 2019, 4 Pages.
"How to sync my rgb?", Retrieved from: https://www.reddit.com/r/techsupport/comments/avbcds/how_to_sync_my_rgb/ehdudov/?utm_source=BD&utm_medium=Search&utm_name=Bing&utm_content=PSR2, Retrieved on: Apr. 22, 2022, 10 Pages.
"Hue Play HDMI Sync Box", Retrieved from: https://www.philips-hue.com/en-ca/p/hue-play-hdmi-sync-box-/046677555221, Retrieved on : Apr. 22, 2022, 18 Pages.
"Human Interface Devices (HID) Information", Retrieved from: https://www.usb.org/hid, Retrieved on: Apr. 22, 2022, 4 Pages.
"JackNet RGB Sync", Retrieved from: https://web.archive.org/web/20220117194225/https://rgbsync.com/, Jan. 17, 2022, 6 Pages.
"LampArraySolidEffect Class", Retrieved from: https://docs.microsoft.com/en-us/uwp/api/windows.devices.lights.effects.lamparraysolideffect?view=winrt-20348, Retrieved on: Apr. 22, 2022, 3 Pages.
"Logitech G Developer Lab", Retrieved from: https://www.logitechg.com/en-in/innovation/developer-lab.html, Retrieved on: Apr. 22, 2022, 6 Pages.
"OpenRGB", Retrieved from: https://openrgb.org/, Retrieved on: Apr. 22, 2022, 5 Pages.
"OpenRGB—Open source RGB lighting control that doesn't depend on manufacturer software, supports Windows and Linux", Retrieved from: https://www.reddit.com/r/pcgaming/comments/lsee45/openrgb_open_source_rgb_lighting_control_that/, Retrieved on: Apr. 22, 2022, 14 Pages.
"Razer Chroma SDK", Retrieved from: https://assets.razerzone.com/dev_portal/C%2B%2B/html/en/index.html, Retrieved on: Apr. 22, 2022, 1 Page.
"Razer Keyboard and Mouse Support Xbox One", Retrieved from: https://www.razer.com/eu-en/gaming-keyboards-keypads/razer-turret-for-xbox-one/supported-games, Retrieved on: Apr. 22, 2022, 5 Pages.
"Razer Turret for Xbox One", Retrieved from: https://www.microsoft.com/en-us/d/razer-turret-for-xbox-one/8qc1qmt3jc2z?activetab=pivot:overviewtab, Retrieved on: Apr. 22, 2022, 5 Pages.
"Razer Virtual Ring Light", Retrieved from: https://www.razer.com/software/razer-virtual-ring-light, Retrieved on: Apr. 22, 2022, 7 Pages.
"Rgb not in sync", Retrieved from: https://www.reddit.com/r/buildapc/comments/nj6efw/rgb_not_in_sync/, Retrieved on: Apr. 22, 2022, 11 Pages.
"Supported Devices", Retrieved from: https://www.signalrgb.com/devices/, Retrieved on: Apr. 22, 2022, 3 Pages.
"Syncing all the different RGB lighting", Retrieved from: https://www.reddit.com/r/gigabytegaming/comments/ajukj8/syncing_all_the_different_rgb_lighting/, Jun. 6, 2015, 12 Pages.
Asus, "The Evolution of Aura Rgb Lighting Leads to an Official Sdk", Retrieved from: https://rog.asus.com/articles/technologies/the-evolution-of-aura-rgb-lighting-leads-to-an-official-sdk/, Jun. 16, 2017, 8 Pages.
"What happens if you use SignalRGB on your RGB setup and get flashbanged in CSGO?", Retrieved from: https://www.tiktok.com/foryou?is_from_webapp=v1&item_id=7002652161704332550&lang=en#/@signalrgb/video/7002652161704332550, Retrieved on: Apr. 22, 2022, 27 Pages.
"Windows.Devices.Lights Namespace", Retrieved from: https://docs.microsoft.com/en-us/uwp/api/Windows.Devices.Lights?view=winrt-22000, Retrieved on: Apr. 22, 2022, 3 Pages.
Abzarian, et al., "HID Usage Tables for Universal Serial Bus (USB)", Published in USB implementers Forum, Apr. 5, 2021, 319 Pages.
Gealogo, David, "How to customize the RGB on a Razer BlackWidow Keyboard", Retrieved from: https://stealthoptional.com/hardware/razer-how-to-customize-a-razer-blackwidows-rgb/, Mar. 3, 2021, 5 Pages.
Harding, Scharon, "Asus Desktop's Embedded Light Bars tell you when Rendering is Complete", Retrieved from: https://arstechnica.com/gadgets/2022/03/asus-desktops-embedded-light-bars-tell-you-when-rendering-is-complete/, Mar. 2, 2022, 7 Pages.
Hopkins, et al., "Write a HID source driver by using Virtual HID Framework (VHF)", Retrieved from: https://docs.microsoft.com/en-us/windows-hardware/drivers/hid/virtual-hid-framework--vhf-, May 10, 2022, 11 Pages.
Lyles, Taylor, "Gaming-Centric Chromebooks Reportedly in the Works", Retrieved from: https://sea.ign.com/news/181379/gaming-centric-chromebooks-reportedly-in-the-workshttps://sea.ign.com/news/181379/gaming-centric-chromebooks-reportedly-in-the-works, Jan. 31, 2022, 4 Pages.
Yee, Alaina, "Hey Microsoft, want to make Windows 11 irresistible? Add universal RGB controls", Retrieved from: https://www.pcworld.com/article/606964/hey-microsoft-you-know-whatd-make-windows-11-irresistible-universal-control-over-rgb.html, Feb. 3, 2022, 6 Pages.
"Windows.Devices.Lights. Effects Namespace", Retrieved from: https://docs.microsoft.com/en-us/uwp/api/windows.devices.lights.effects?view=winrt-22621&viewFallbackFrom=winrt-20348-, Retrieved on: Apr. 22, 2022, 2 Pages.
"International Search Report and Written Opinion Issued in PCT Application No. PCT/US23/022302", Mailed Date: Aug. 1, 2023, 9 Pages.

* cited by examiner

CENTRALIZED CONTROL OF LIGHTING-ENABLED PERIPHERAL DEVICES

BACKGROUND

Lighting-enabled peripheral devices are becoming increasingly common. In addition to a main purpose served by the peripheral device (e.g., a speaker outputs sound, a mouse controls a cursor and enables user clicks), lighting-enabled peripheral devices are configured with a lighting component (e.g., an array of light emitting diodes (LEDs)) that is configured to output different colors. The lighting component is configured to output colors in a color space such as red-green-blue (RGB). When a user connects different lighting-enabled peripheral devices to a computing device, the user is able to create and customize a personal lighting environment the user desires for a particular computing experience (e.g., a gaming experience, a video streaming experience, a focus time session), or non-computing experience (e.g., the user may want to simply read a book in an office in which the lighting-enabled peripheral devices are configured).

Manufacturers (which may be referred to herein as original equipment manufacturers (OEMs)) of lighting-enabled peripheral devices typically create and provide "lighting" applications to enable a user to control the lighting aspect of the lighting-enabled peripheral devices. In this way, the user is able to create and customize the personal lighting environment. Moreover, the OEMs further create and provide application programming interfaces (APIs) and/or software development kits (SDKs) to enable a developer of a "computing" application to write code that interacts with the lighting-enabled peripheral devices in order to create a unique lighting experience for the computing application.

With the aforementioned growth in lighting-enabled peripheral devices, there is an increasing number of OEMs that have entered the market (e.g., CORSAIR, RAZER, LOGITECH, ASUS, STEELSERIES). This growth is based on the popularity of the lighting experience, but also based on the increasing number of available types of lighting-enabled peripheral devices. Generally, an immersive lighting experience is improved if the user can connect more lighting-enabled peripheral devices to a computing device. For example, to create an immersive lighting experience, a user may connect any of the following peripheral devices to a computing device: a lighting-enabled keyboard, a lighting-enabled mouse, a lighting-enabled mouse pad, a lighting-enabled speaker or speaker tower, a lighting-enabled display, lighting-enabled earphones, a lighting-enabled computer tower, a lighting-enabled chair, a lighting-enabled game controller, a lighting-enabled strip, and so forth.

Unfortunately, an OEM's lighting application, API, and/or SDK are proprietary, and therefore, are only useable with the OEM's own hardware. Stated alternatively, the conventional lighting software available for the different types of lighting-enabled peripheral devices is siloed and fragmented due to the different brands. Consequently, a user has to download and learn to use an increasing number of lighting applications if the user wants to create a diverse lighting ecosystem in which lighting-enabled peripheral devices from different OEMs are connected to a computing device. Similarly, a developer of a computing application has to engage and interact with an increasing number of APIs and/or SDKs if the developer wants users of their computing application to be able to create a diverse lighting ecosystem in which lighting-enabled peripheral devices from different OEMs are connected to a computing device.

This places a huge burden on users of lighting-enabled peripheral devices and/or developers of computing applications that desire to tap in to the potential that lighting-enabled peripheral devices offer to various computing experiences. Moreover, this prevents a user and/or a developer from being able to effectively and efficiently synchronize lighting features across lighting-enabled peripheral devices from different OEMs. Consequently, creating and customizing a personal lighting environment for a particular computing experience is difficult to attain. It is with respect to these and other considerations that the disclosure made herein is presented.

SUMMARY

The techniques disclosed herein implement a centralized lighting module configured to control a diverse set of lighting-enabled peripheral devices. The set of lighting-enabled peripheral devices is diverse with respect to a type and/or a manufacturer (an original equipment manufacturer (OEM)). The lighting module is referred to as a centralized lighting module because the lighting module is part of an operating system of a computing device, which may control all peripheral devices connected to the computing device. Consequently, a user of a computing device no longer has to download and learn to use multiple different lighting applications if the user wants to create a diverse lighting ecosystem in which lighting-enabled peripheral devices from different OEMs are connected to the computing device. Similarly, a developer of a computing application no longer has to engage and interact with multiple application programming interfaces (APIs) and/or software development kits (SDKs) if the developer wants users of their computing application to be able to create a diverse lighting ecosystem in which lighting-enabled peripheral devices from different OEMs are connected to a computing device.

Rather, via the techniques described herein, users of computing devices can control and synchronize connected lighting-enabled peripheral devices via settings defined via the centralized lighting module of the operating system. Moreover, developers of computing applications are able to write standardized code to interact with the centralized lighting module of the operating system, thereby eliminating the need to write different code to ensure the lighting effects of the computing application are compatible with different types of lighting-enabled peripheral devices and/or different OEMs of lighting-enabled peripheral devices.

As described herein, an operating system of a computing device identifies the lighting-enabled peripheral devices that are connected to the computing device. A lighting-enabled peripheral device is configured with a lighting component (e.g., an array of pixels or light emitting diodes (LEDs)) that can output different colors in a defined color space such as red-green-blue (RGB). A user connects the lighting-enabled peripheral devices to the computing device to create and customize an immersive lighting experience. Accordingly, the lighting-enabled peripheral devices can be different types such as: a lighting-enabled keyboard, a lighting-enabled mouse, a lighting-enabled mouse pad, a lighting-enabled speaker or speaker tower, a lighting-enabled display, lighting-enabled earphones, a lighting-enabled computer tower, a lighting-enabled chair, a lighting-enabled game controller, a lighting-enabled strip, and so forth. A lighting-enabled peripheral device can be connected to the computing device via a wired connection or a wireless connection (e.g., BLUETOOTH).

After the operating system identifies the lighting-enabled peripheral devices that are connected to the computing device, the operating system registers the identified lighting-enabled peripheral devices for control via the centralized lighting module. Based on a user request, the centralized lighting module configures and displays a graphical user interface that enables the user to view the connected lighting-enabled peripheral devices and to control the lighting experience by defining settings (e.g., making selections). A user can define the settings on a per device basis. Therefore, the graphical user interface provides the user with options to select one of the connected lighting-enabled peripheral devices. Once the user selects a connected lighting-enabled peripheral device, the graphical user interface provides the user with options that control the output of the selected lighting-enabled peripheral device such that different lighting effects can be realized (e.g., different colors, varying light intensity, flashing or blinking lights, different phenomenon such as waterfalls, fires, rainbows). Consequently, the user can customize a complete immersive lighting experience by defining settings for each of the connected lighting-enabled peripheral devices in a centralized location.

In one example, the graphical user interface presents options that the user may select to define a color for an ambient light mode of a lighting-enabled peripheral device. When operating in the ambient light mode, the lighting component of the lighting-enabled peripheral device persistently outputs a selected ambient color.

In another example, the graphical user interface presents options for the user to enable a notification mode for a lighting-enabled peripheral device. The notification mode alters the output of the lighting component of the lighting-enabled peripheral device in a way to catch the user's attention. Accordingly, the operating system detects a notification to be output by the computing device. The notification may be an application notification (e.g., a received email) or a system notification (e.g., battery is low). A user may define a list of applications and/or system components which are approved for the notification mode via the centralized lighting module. The operating system passes an indication of the notification to the centralized lighting module, which then instructs the lighting-enabled peripheral device to alter the output of the lighting component as a signal to the user that there is a notification (e.g., to view via a notification center). The altered output includes a lighting effect such as a change in color (e.g., from a defined "ambient" color to a defined "notification" color), an increase or decrease in intensity of the light, a flashing light or blinking light. The lighting effect can be a system-defined default setting or a user-defined setting for notifications. Since the lighting effect is intended to catch the user's attention for a notification, the time period in which the output is altered is temporary. For instance, the time period may be a predetermined amount of time (e.g., two seconds, three seconds). Alternatively, the time period may be dynamically determined based on a designated time period associated with the notification, which is established by the application or system component that issued the notification. When the time period expires, the altered output reverts back to the previous light output (e.g., the ambient light setting).

When the ambient and/or notification settings described above are defined (e.g., selected and/or enabled), the centralized lighting module communicates instructions for the lighting components of the connected lighting-enabled peripheral devices to function in accordance with the defined settings.

In yet another example, the graphical user interface presents options for the user to enable a computing application control mode for a lighting-enabled peripheral device. If the user enables the computing application control mode for the lighting-enabled peripheral device, the output of the lighting component of the lighting-enabled peripheral device is managed by a specific computing application. A user may define a list of computing applications which are approved for computing application control mode via the centralized lighting module. Accordingly, the operating system detects the launch and/or execution of an approved computing application that wants to control the lighting-enabled peripheral device. This control is temporary as it is limited to a time period when the computing application is actively executing (e.g., the user is playing a game session, the user is videoconferencing with others). In one implementation, the operating system exposes a lighting API and/or SDK so approved computing applications can access the centralized lighting module and request control of the lighting experience for particular experiences. Based on the request, the centralized lighting module is configured to grant an approved computing application temporary control of the lighting component. That is, the operating system enables the code from the computing application to control the lighting-enabled peripheral devices rather than the centralized lighting module. When the time period expires (e.g., the session ends or the computing application is closed), the control of the lighting component returns to the centralized lighting module. In one example, the output of the lighting component reverts back to an ambient light setting.

While the modes described above are applied to the lighting-enabled peripheral devices on a per device basis, it is understood in the context of this disclosure that a defined setting can universally apply to all the connected lighting-enabled peripheral devices. Alternatively, the connected lighting-enabled peripheral devices can be separated in to multiple groups. For instance, a first group may be related to device input such as a mouse, a mousepad, a keyboard, and a controller, while a second group may be related to device output such as a display, a speaker, and earphones. Consequently, a defined setting can apply to a group of connected lighting-enabled peripheral devices.

The centralized lighting module is further configured to enable the user to transfer control of a specific lighting-enabled peripheral device from the centralized lighting module to an external (e.g., third-party) lighting application. Typically, a third-party lighting application is developed and provided by the OEM of the specific lighting-enabled peripheral device. Moreover, the user may have customized the control of the specific lighting-enabled peripheral device using the third-party lighting application. Accordingly, the graphical user interface presents options for the user to enable an external (e.g., third-party) lighting application control mode for a lighting-enabled peripheral device. When enabled, the centralized lighting module grants permanent control of the lighting component of the lighting-enabled peripheral device to the external (e.g., third-party) lighting application, until later changed by the user (if at all).

Consequently, the techniques described herein create cohesion across a previously fragmented peripheral device lighting ecosystem. That is, a user is provided with a centralized location for efficient and effective creation and/or customization of an immersive lighting experience, even if the connected lighting-enabled peripheral devices are of different types and/or from different manufacturers. Moreover, the user does not need to have the knowledge and/or the user does not need to spend a considerable amount of time engaging with different external lighting applications to create the immersive lighting experience.

The techniques disclosed herein provide a number of features that improve existing computing devices. For example, computing, processing, and/or networking resources are not spent downloading and interacting with multiple different lighting applications provided by various OEMs, in order to create an immersive lighting experience. Stated alternatively, efficient access and use mechanisms, such as the ones described herein, can conserve computing resources because a user is no longer required to direct their attention to different applications to control a lighting experience. Other technical benefits not specifically mentioned herein can also be realized through implementations of the disclosed subject matter.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The following Detailed Description discloses techniques and technologies for implementing a centralized lighting module configured to control a diverse set of lighting-enabled peripheral devices. The set of lighting-enabled peripheral devices is diverse with respect to a type and/or a manufacturer (an original equipment manufacturer (OEM)). The lighting module is referred to as a centralized lighting module because the lighting module is part of an operating system of a computing device, which may control all peripheral devices connected to the computing device. Consequently, a user of a computing device no longer has to download and learn to use multiple different lighting applications if the user wants to create a diverse lighting ecosystem in which lighting-enabled peripheral devices from different OEMs are connected to the computing device. Similarly, a developer of a computing application no longer has to engage and interact with multiple application programming interfaces (APIs) and/or software development kits (SDKs) if the developer wants users of their computing application to be able to create a diverse lighting ecosystem in which lighting-enabled peripheral devices from different OEMs are connected to a computing device.

Rather, via the techniques described herein, users of computing devices can control and synchronize connected lighting-enabled peripheral devices via settings defined via the centralized lighting module of the operating system. Moreover, developers of computing applications are able to write standardized code to interact with the centralized lighting module of the operating system, thereby eliminating the need to write different code to ensure the lighting effects of the computing application are compatible with different types of lighting-enabled peripheral devices and/or different OEMs of lighting-enabled peripheral devices. Various examples, scenarios, and aspects that are described below with reference to FIGS. 1-11.

Figure 1:
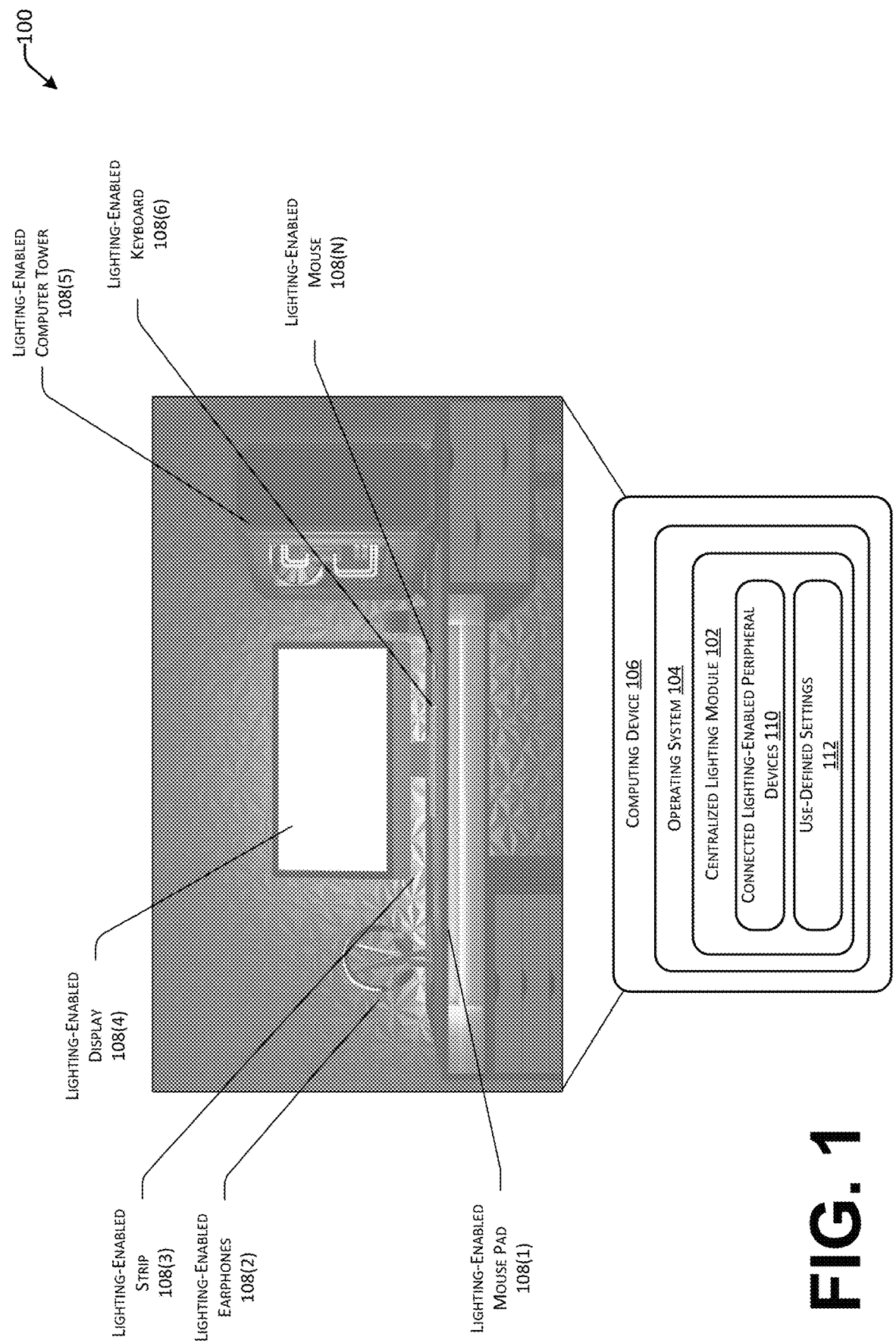
FIG. 1 illustrates an example environment in which a centralized lighting module is part of an operating system of a computing device and is configured to control multiple lighting-enabled peripheral devices from different OEMs.

FIG. 1 illustrates an example environment 100 in which a centralized lighting module 102 is part of an operating system 104 of a computing device 106 and is configured to control multiple lighting-enabled peripheral devices 108(1-N). As described above, a lighting-enabled peripheral device 108(1-N) is configured with a lighting component (e.g., an array of pixels or light emitting diodes (LEDs)) that can output different colors in a defined color space such as red-green-blue (RGB). A given user may desire to connect a number N of different types of lighting-enabled peripheral devices to create and customize a personal and immersive lighting experience.

As an example, the setup shown in FIG. 1 includes: a lighting-enabled mouse pad 108(1), lighting-enabled earphones 108(2), a lighting-enabled strip 108(3), a lighting-enabled display 108(4), a lighting-enabled computer tower 108(5), a lighting-enabled keyboard 108(6), and a lighting-enabled mouse 108(N). Other types of lighting enabled peripheral devices are also contemplated in the context of this disclosure (e.g., a lighting-enabled printer, a lighting-enabled game controller, a lighting-enabled chair, a lighting-enabled speaker).

As the availability and popularity of lighting-enabled peripheral devices grows, the number N of lighting-enabled peripheral devices for a given user is increasing. Moreover, the number of users that desire to create and customize a personal lighting experience for varying contexts (e.g., computer gaming, computer streaming, computer productivity sessions) is increasing. Due to this increase, it is likely that the lighting-enabled peripheral devices 108(1-N) are manufactured and/or sold by different OEMS. As described above, this creates a burden on the user to download and learn proprietary lighting applications, provided by the different OEMs, in order for the user to create and customize a personal and immersive lighting experience in which the output for all the lighting-enabled peripheral devices 108(1-N) is coordinated and/or synchronized.

The centralized lighting module 102 relieves this burden on the user by providing a single location where coordination and synchronization of the lighting-enabled peripheral devices 108(1-N) from different OEMs can occur. Accordingly, the operating system 104 is configured to identify the lighting-enabled peripheral devices 108(1-N) that are connected to the computing device 106. An individual lighting-enabled peripheral device 108(1-N) can be connected to the computing device 106 via a wired connection or a wireless connection (e.g., BLUETOOTH).

After the operating system 104 identifies the lighting-enabled peripheral devices 108(1-N) that are connected to the computing device 106, the operating system 104 registers them as connected lighting-enabled peripheral devices 110 for control via the centralized lighting module 102. As described below with respect to FIGS. 2, 3, 5A, 5B, 7, and 9, the centralized lighting module 102 configures and displays graphical user interface(s) that enable a user to view the connected lighting-enabled peripheral devices 110 and to control the lighting experience by defining settings 112 (e.g., making selections). For example, the user can enable different lighting effects to be realized (e.g., different ambient colors, lighting notifications, varying light intensity, flashing or blinking lights, different phenomenon such as waterfalls, fires, rainbows). Consequently, the user can customize a complete immersive lighting experience by defining settings for each of the connected lighting-enabled peripheral devices in a centralized location.

Figure 2:
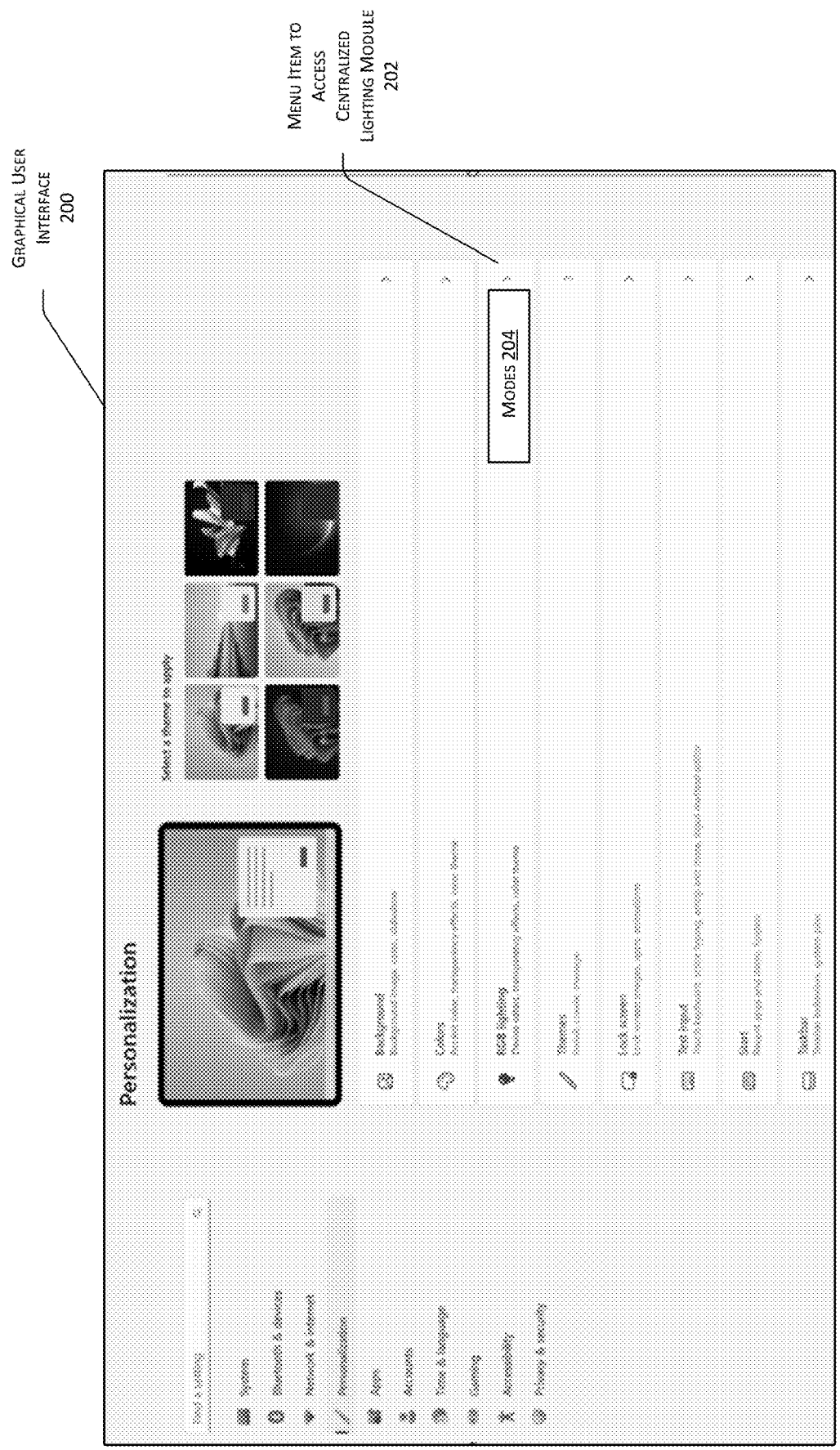
FIG. 2 illustrates an example graphical user interface that shows a system menu where a user can access the centralized lighting module.

FIG. 2 illustrates an example graphical user interface 200 that shows a system menu where a user can access the centralized lighting module 102. As mentioned above, the centralized lighting module is implemented via the operating system 104, and thus, the user can access the centralized lighting module 102 and define the settings 112 via the system menu. In the example of FIG. 2, there is a personalization page where the user can customize operations of the computing device 106. Part of the personalization page includes a menu item 202 labeled "RGB Lighting", which provides access to the functionality of the centralized lighting module 102. As will be discussed in greater detail below, the centralized lighting module 102 provides options for a user to enable different modes 204.

Figure 3:
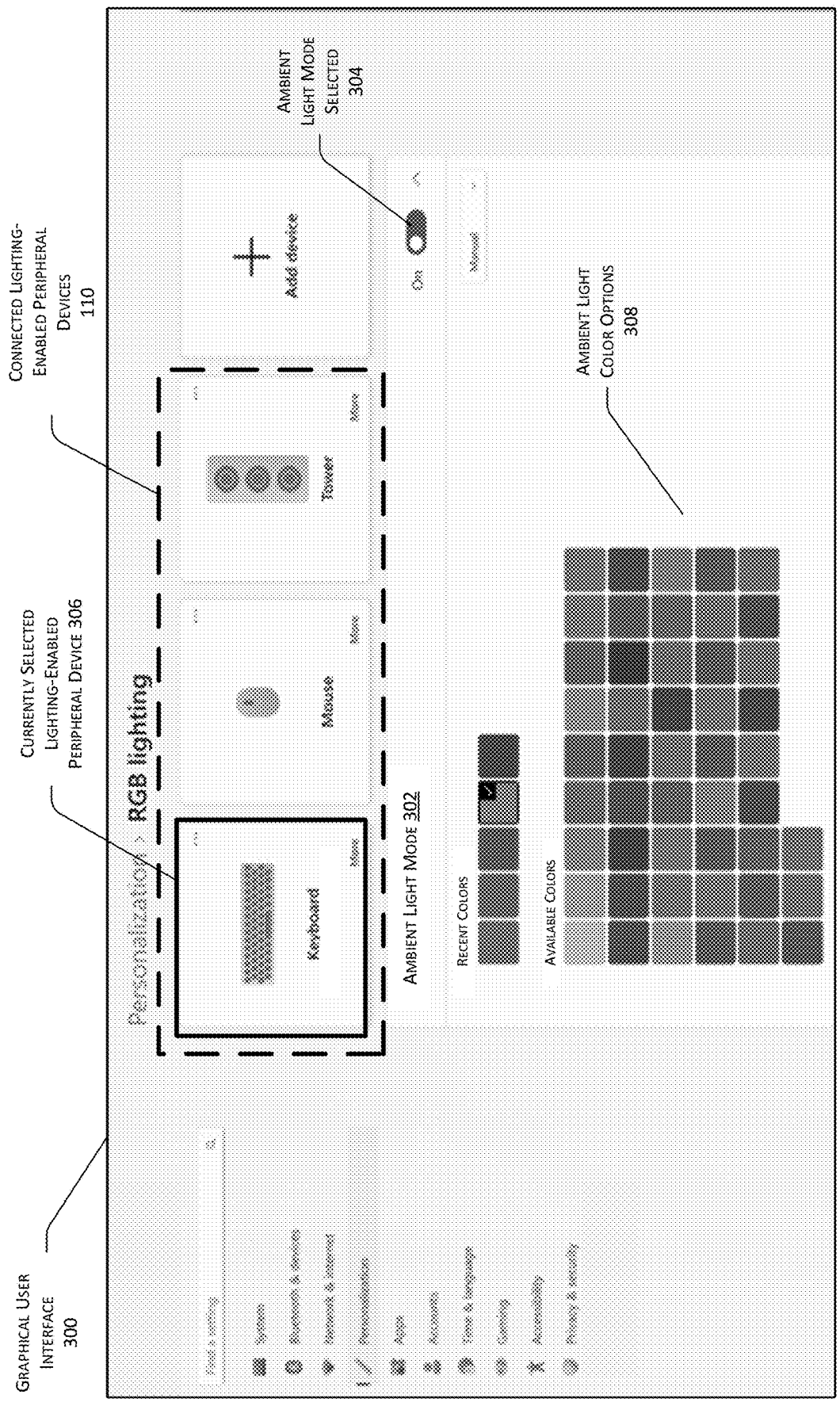
FIG. 3 illustrates an example graphical user interface that shows options selectable by a user to define ambient color output for a lighting-enabled peripheral device.

FIG. 3 illustrates an example graphical user interface 300 that shows options selectable by a user to define ambient color output for a lighting-enabled peripheral device. The graphical user interface 300 can be displayed based on a user selection of the "RGB Lighting" menu item 202 in FIG. 2. In the example of FIG. 3, the user is viewing options for an ambient light mode 302, and thus, the user has selected the ambient light mode via a toggle element 304. When operating in the ambient light mode 302, the lighting component of a lighting-enabled peripheral device persistently outputs a selected ambient color.

Via the graphical user interface 300, the centralized lighting module 102 provides the user with options to select one of the connected lighting-enabled peripheral devices 110. As shown at the top of the graphical user interface 300, the connected lighting-enabled peripheral devices 110 are displayed. The user provides a selection of a current lighting-enabled peripheral device 306 (e.g., the lighting-enabled keyboard 108(6)), and thus, the centralized lighting module 102 provides the user with color options 308 for ambient light to be output by the currently selected lighting-enabled peripheral device 306. Alternatively, the user may enter a color and the centralized lighting module 102 can determine whether the entered color is supported. Once a user selects (or enters) a particular color, the centralized lighting module 102 is configured to issue an instruction for the currently selected lighting-enabled peripheral device 306 to display the selected (or entered) color in an ambient mode. In one example, the ambient mode is a default mode for the connected lighting-enabled peripheral devices 110, and thus, the selected (or entered) ambient light color is output by the lighting components unless a higher priority or override instruction is issued by the centralized lighting module 102.

In FIG. 3, and in further examples illustrated herein, the user defines the settings 112 for ambient light on a per lighting-enabled peripheral device basis. That is, after the user has defined ambient light settings 112 for the lighting-enabled keyboard 108(6), the user can change the current selection to another lighting-enabled peripheral device such as the lighting-enabled mouse 108(N) (shown next to the lighting-enabled keyboard 108(6) in FIG. 3). This allows the user to efficiently create and customize, via a centralized location, a personal lighting experience where multiple different types of lighting-enabled peripheral devices output various ambient colors.

However, it is understood in the context of this disclosure that a defined ambient setting can universally apply to all the connected lighting-enabled peripheral devices 110. Alternatively, the connected lighting-enabled peripheral devices 110 can be separated in to multiple groups. For instance, a first group may be related to device input such as a mouse, a mousepad, a keyboard, and a controller, while a second group may be related to device output such as a display, a speaker, and earphones. Consequently, a defined ambient setting can apply to a group of connected lighting-enabled peripheral devices.

Figure 4:
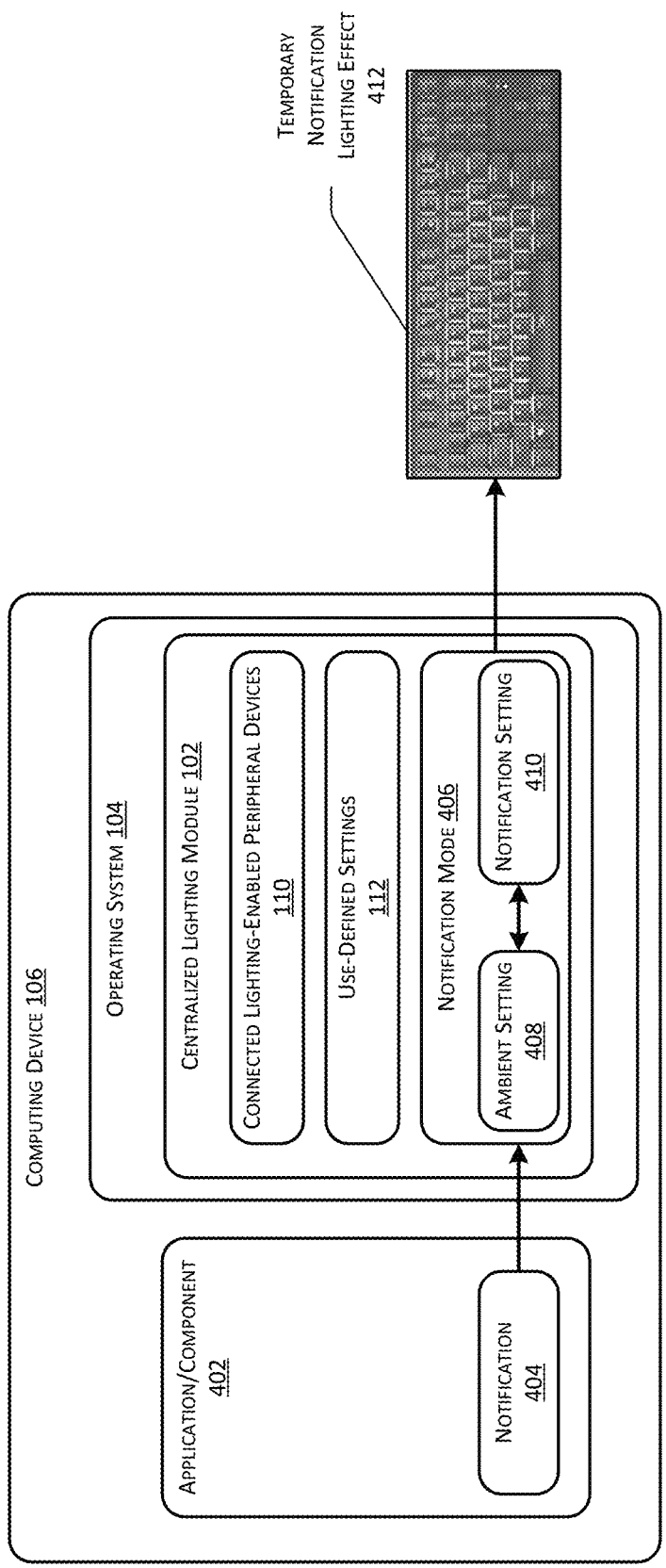
FIG. 4 illustrates an example environment in which the centralized lighting module is configured to use a lighting-enabled peripheral device to indicate a notification from an application or system component.

FIG. 4 illustrates an example environment in which the centralized lighting module 102 is configured to use a lighting-enabled peripheral device to indicate a notification 402 from an application or system component 404. Accordingly, the centralized lighting module 102 can operate in a notification mode 406. While in the notification mode 406, the operating system 104 is configured to pass an indication of the notification 404 to the centralized lighting module 402. The centralized lighting module 402 then instructs a lighting-enabled peripheral device (e.g., the lighting enabled keyboard 108(6)) to implement a lighting effect that alters the output of the lighting component as a signal to the user that there is a notification 404 (e.g., to view via a notification center). Stated alternatively, the notification mode 406 is configured to alter the output of the lighting component of the lighting-enabled peripheral device in a way to catch the user's attention.

For instance, the notification mode 406 may cause the lighting component to change the output from an ambient setting 408 (e.g., an ambient color) to a notification setting 410 (e.g., a notification color). This creates a temporary notification lighting effect 412 intended to catch the user's attention. Additionally or alternatively, the notification setting 410 and temporary notification lighting effect 412 can be associated with an increase or decrease in intensity of the light, a flashing light or blinking light, or other lighting effects intended to grab the user's attention.

Since the notification setting 410 is intended to catch the user's attention for a notification 404, the time period in which the output is altered is temporary. For instance, the time period may be a predetermined amount of time (e.g., two seconds, three seconds). Alternatively, the time period may be dynamically determined based on a designated time period associated with the notification 404, which is established by the application or system component 402 that issued the notification 404. When the time period expires, the altered output reverts back to the previous light output. Following the example mentioned above, the centralized lighting module 102 would revert back to the ambient setting 408.

Figure 5A:
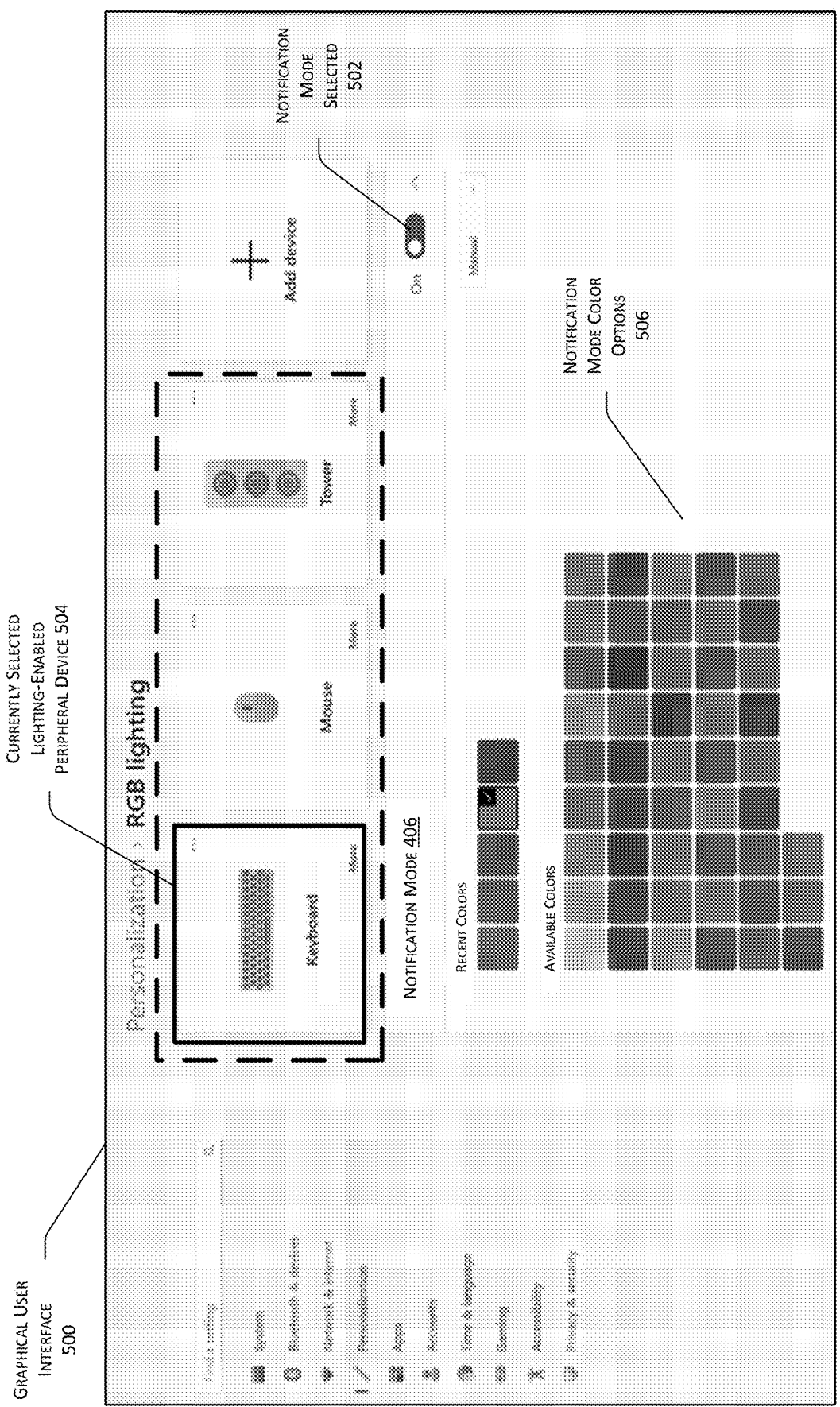
FIG. 5A illustrates an example graphical user interface that shows options selectable by a user to define a notification setting for a lighting-enabled peripheral device.

FIG. 5A illustrates an example graphical user interface 500 that shows options selectable by a user to define a notification setting for a lighting-enabled peripheral device. The graphical user interface 500 can be displayed based on a user selection of the "RGB Lighting" menu item 202 in FIG. 2. In the example of FIG. 5A, the user is viewing options for the notification mode 406, and thus, the user has selected the notification mode via a toggle element 502. When operating in the notification mode 406, the centralized lighting module 102 is configured to receive notifications and issue instructions for lighting components of lighting-enabled peripheral devices to alter the output to signal the notifications.

Via the graphical user interface 500, the centralized lighting module 102 provides the user with options to select one of the connected lighting-enabled peripheral devices 110. As shown at the top of the graphical user interface 500, and similar to FIG. 3, the connected lighting-enabled peripheral devices 110 are displayed. The user provides a selection of a current lighting-enabled peripheral device 504 (e.g., the lighting-enabled keyboard 108(6)), and thus, the centralized lighting module 102 provides the user with color options 506 for a notification to be output by the currently selected lighting-enabled peripheral device 504. Once a user selects a particular color, the centralized lighting module 102 is configured to register the notification setting 410 for the currently selected lighting-enabled peripheral device 306 to display the selected color in an ambient mode. While FIG. 5A illustrates a change in color for the notification setting 410, it is understood that other lighting effects can be defined for the notification setting (e.g., a flashing light, an increase or decrease in intensity).

Similar to FIG. 3, the user in FIG. 5A defines the settings 112 for notifications on a per lighting-enabled peripheral device basis. That is, after the user has defined notification settings 112 for the lighting-enabled keyboard 108(6), the user can change the current selection to another lighting-enabled peripheral device such as the lighting-enabled mouse 108(N) (shown next to the lighting-enabled keyboard 108(6) in FIG. 5A). This allows the user to specifically define which lighting-enabled peripheral devices are approved for signaling a notification.

However, it is understood in the context of this disclosure that a defined notification setting can universally apply to all the connected lighting-enabled peripheral devices 110. Alternatively, the connected lighting-enabled peripheral devices 110 can be separated in to multiple groups. For instance, a first group may be related to device input such as a mouse, a mousepad, a keyboard, and a controller, while a second group may be related to device output such as a display, a speaker, and earphones. Consequently, a defined notification setting can apply to a group of connected lighting-enabled peripheral devices.

Figure 5B:
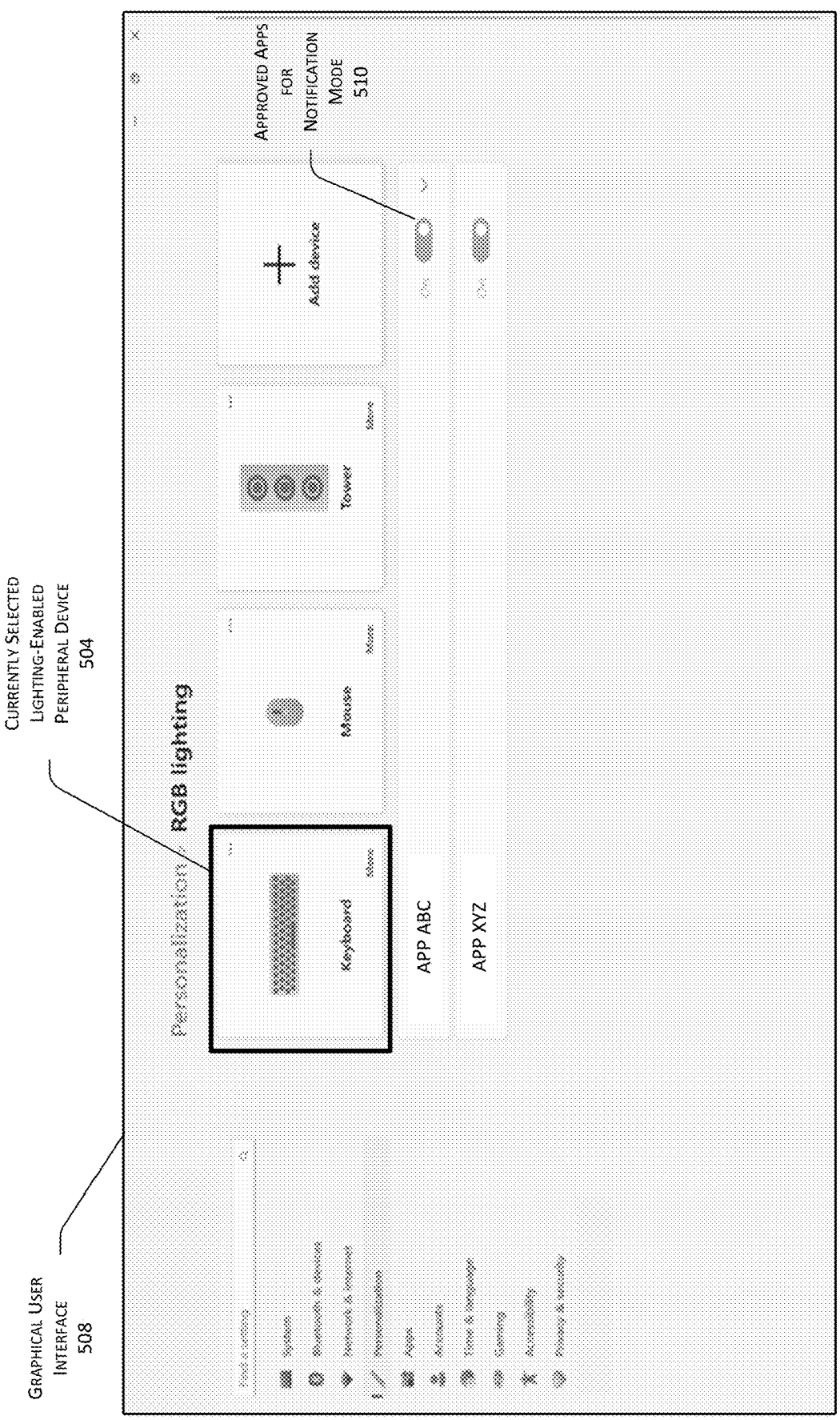
FIG. 5B illustrates an example graphical user interface that shows options selectable by a user to define applications and/or system components that are approved to cause a notification setting for a lighting-enabled peripheral device.

FIG. 5B illustrates an example graphical user interface 508 that shows options selectable by a user to define applications and/or system components that are approved to cause a notification mode for a lighting-enabled peripheral device. As shown, the user has used toggle elements 510 to approve the lighting-related notification output for "App ABC" and "App XYZ". The centralized lighting module 102 can display various system components (e.g., battery level indicator, system health monitor) and/or installed applications (e.g., an email application, a collaboration application, a browser application), or the user can enter specific system components and/or installed applications for which they desire to receive notifications. Moreover, the approval can be made with respect to individual connected lighting-enabled peripheral devices (e.g., the currently selected lighting-enabled peripheral device 504), for defined groups of connected lighting-enabled peripheral devices, or for all the connected lighting-enabled peripheral devices. In various examples, the temporary notification lighting effect 412 can be a system-defined default setting, and thus, the user would not need to navigate the graphical user interface 500 of FIG. 5A.

Figure 6:
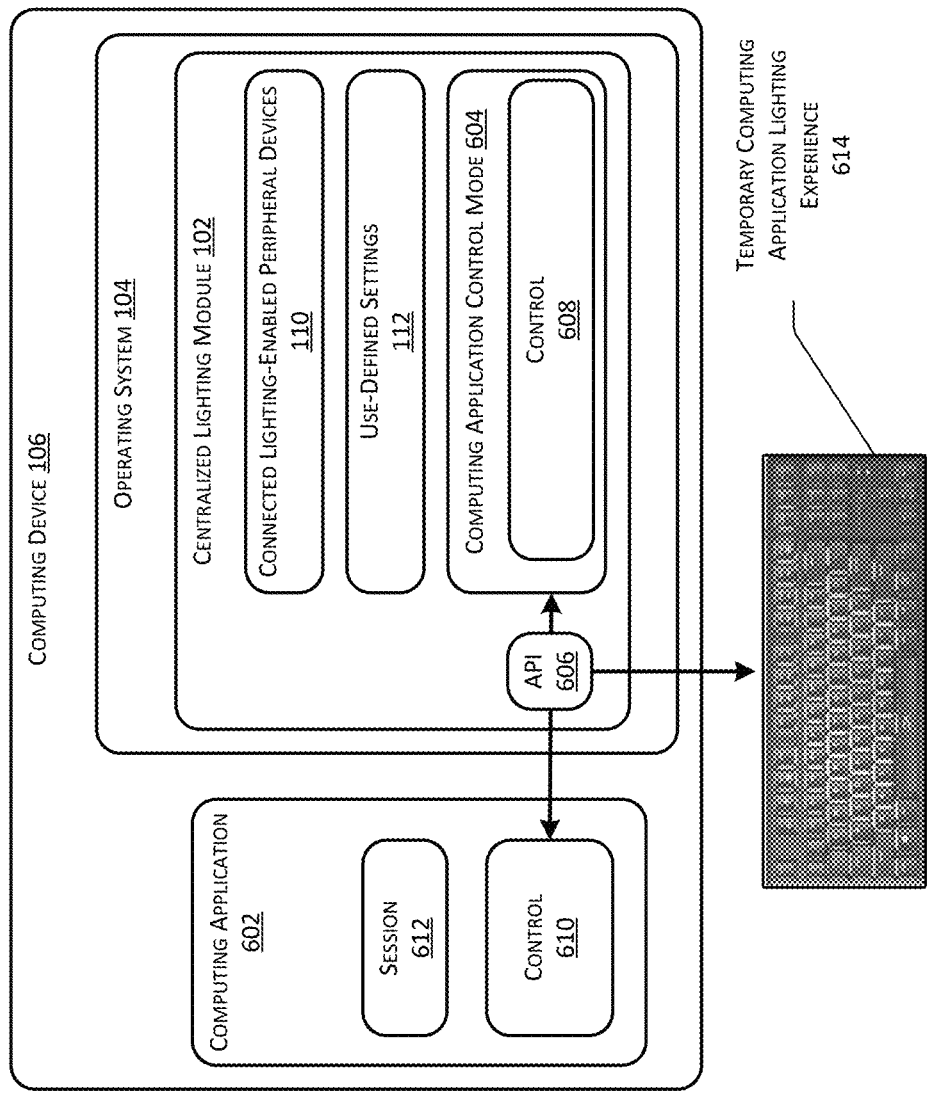
FIG. 6 illustrates an example environment in which the centralized lighting module is configured to enable a computing application to temporarily control a lighting-enabled peripheral device.

FIG. 6 illustrates an example environment in which the centralized lighting module 102 is configured to enable a computing application 602 to temporarily control a lighting-enabled peripheral device. Accordingly, the centralized lighting module 102 can operate in a computing application control mode 604. While in the computing application control mode 604, the centralized lighting module 102 is configured to monitor for requests received via an API 606. As described above, the API 606 associated with the centralized lighting module 102 enables developer(s) of the computing application 602 to write a single instance of code for lighting aspects of the computing application 602 and know that the lighting aspects can be implemented across a diverse lighting ecosystem where lighting-enabled peripheral devices vary in type and OEM. In this way, the computing application 602 can provide a unique lighting experience for its use. Furthermore, the centralized lighting module 102 may expose an SDK to help the developer(s) write code that is compatible with the API 606 and/or the centralized lighting module 102.

When a request for control is received from the computing application 602 via the API 606, the centralized lighting module 102 passes control of the lighting-enabled peripheral devices from the operating system 608 to the computing application 610. For instance, the user may start a session 612 (e.g., a gaming session, a videoconference session, a streaming session), and while participating in the session 612, the connected lighting-enabled peripheral devices 110 are controlled by the computing application 110. Since the session 612 ends at some point (e.g., the game is over, the videoconference meeting ends), the control granted to the computing application 602 is temporary control that results in a temporary computing application lighting experience 614. Once the session 612 ends, the control of the lighting-enabled peripheral devices is returned to the operating system (e.g., the centralized lighting module 102).

Figure 7:
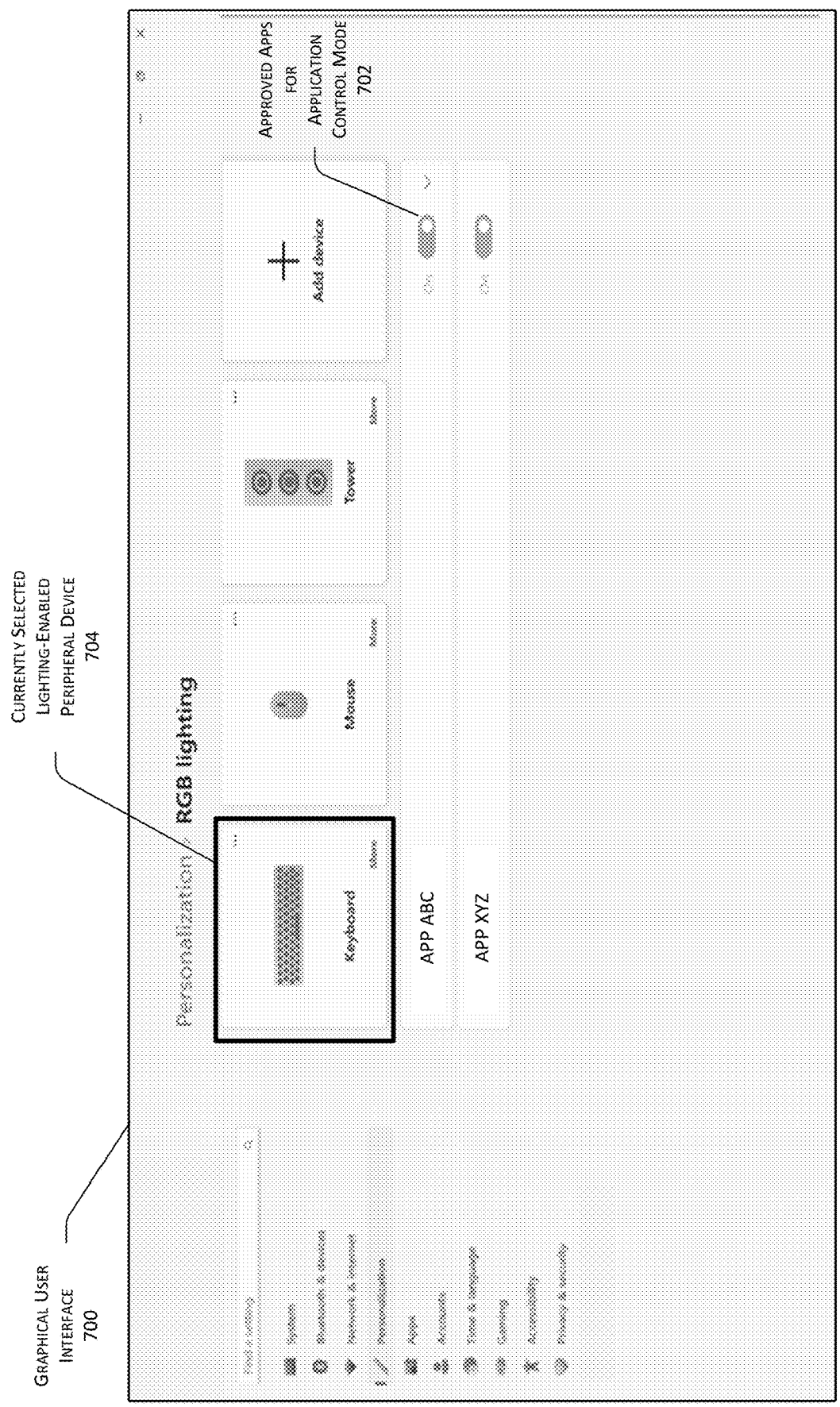
FIG. 7 illustrates an example graphical user interface that shows options selectable by a user to define computing applications that are approved to temporarily control a lighting-enabled peripheral device.

FIG. 7 illustrates an example graphical user interface 700 that shows options selectable by a user to define computing applications that are approved to temporarily control a lighting-enabled peripheral device. Although FIG. 7 describes different settings, the approach is similar to FIG. 5B in that the user has used toggle elements 702 to approve external control for "App ABC" and "App XYZ". Moreover, the approval can be made with respect to individual connected lighting-enabled peripheral devices (e.g., the currently selected lighting-enabled peripheral device 704), for defined groups of connected lighting-enabled peripheral devices, or for all the connected lighting-enabled peripheral devices.

Figure 8:
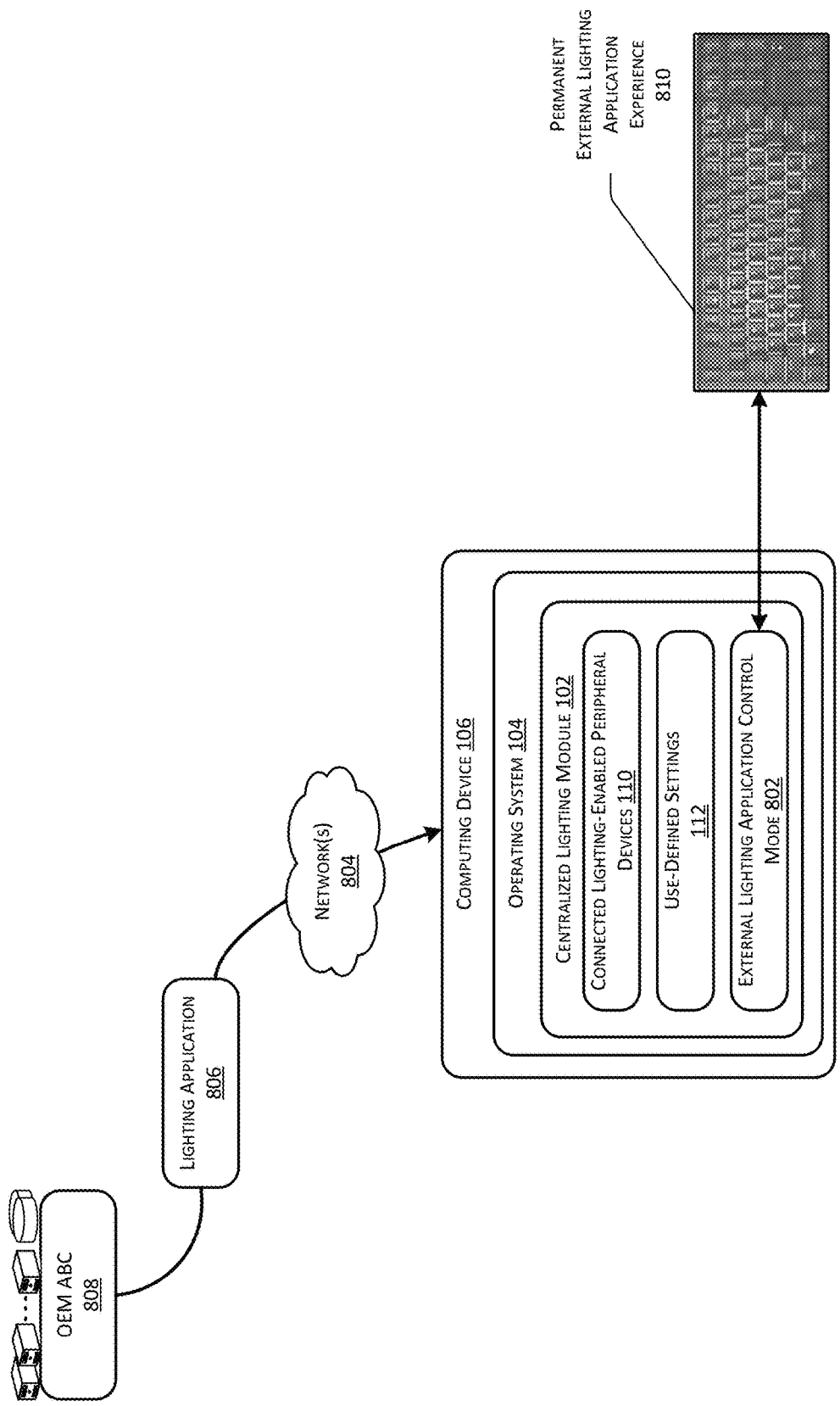
FIG. 8 illustrates an example environment in which the centralized lighting module is configured to enable an external (e.g., third-party) lighting application to permanently control a lighting-enabled peripheral device.

FIG. 8 illustrates an example environment in which the centralized lighting module 102 is configured to enable an external (e.g., third-party) lighting application to permanently control a lighting-enabled peripheral device. That is, the centralized lighting module 102 enables the user to set an external (e.g., third-party) lighting application control mode 802 where control of a specific lighting-enabled peripheral device is transferred from the centralized lighting module 102 to an external lighting application.

As previously described, third-party lighting applications are developed and provided by the OEMs of specific lighting-enabled peripheral devices. FIG. 8 illustrates that the computing device 106 downloads, via network(s) 804, a lighting application 806 from a service provided by the "OEM ABC" 808. The lighting application 806 may provide more extensible and/or more experience-focused lighting features (e.g., a cool lighting effect for an explosion in a game), which are not available via the centralized lighting module 102. To allow the user to benefit from the experiences offered by a third-party lighting application 806, the centralized lighting module 102 can enable the third-party lighting application control mode 802 for specific lighting-enabled peripheral devices. When enabled, the centralized lighting module 102 grants permanent control of the lighting component to the third-party lighting application 806 from the OEM of the lighting-enabled peripheral device. This enables a permanent third-party lighting application experience 810.

Figure 9:
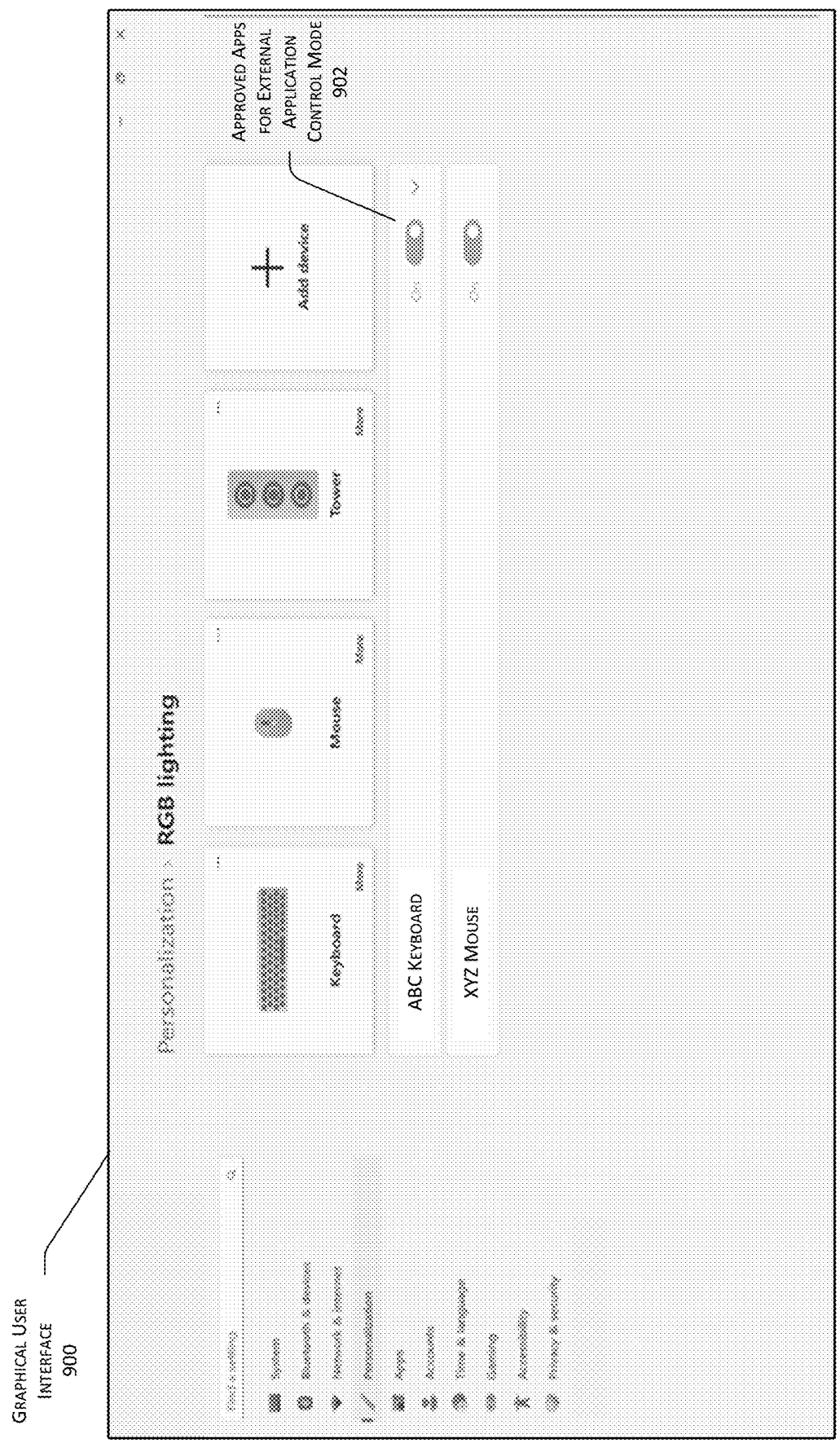
FIG. 9 illustrates an example graphical user interface that shows options selectable by a user to define which lighting-enabled peripheral devices can be permanently controlled by an external (e.g., third-party) lighting application.

FIG. 9 illustrates an example graphical user interface 900 that shows options selectable by a user to define which lighting-enabled peripheral devices can be permanently controlled by a third-party lighting application. As shown, the user has used toggle elements 902 to approve external lighting application control for the "ABC Keyboard" and the "XYZ Mouse". Consequently, the centralized lighting module 102 does not control the lighting components of these lighting-enabled peripheral devices.

Figure 10:
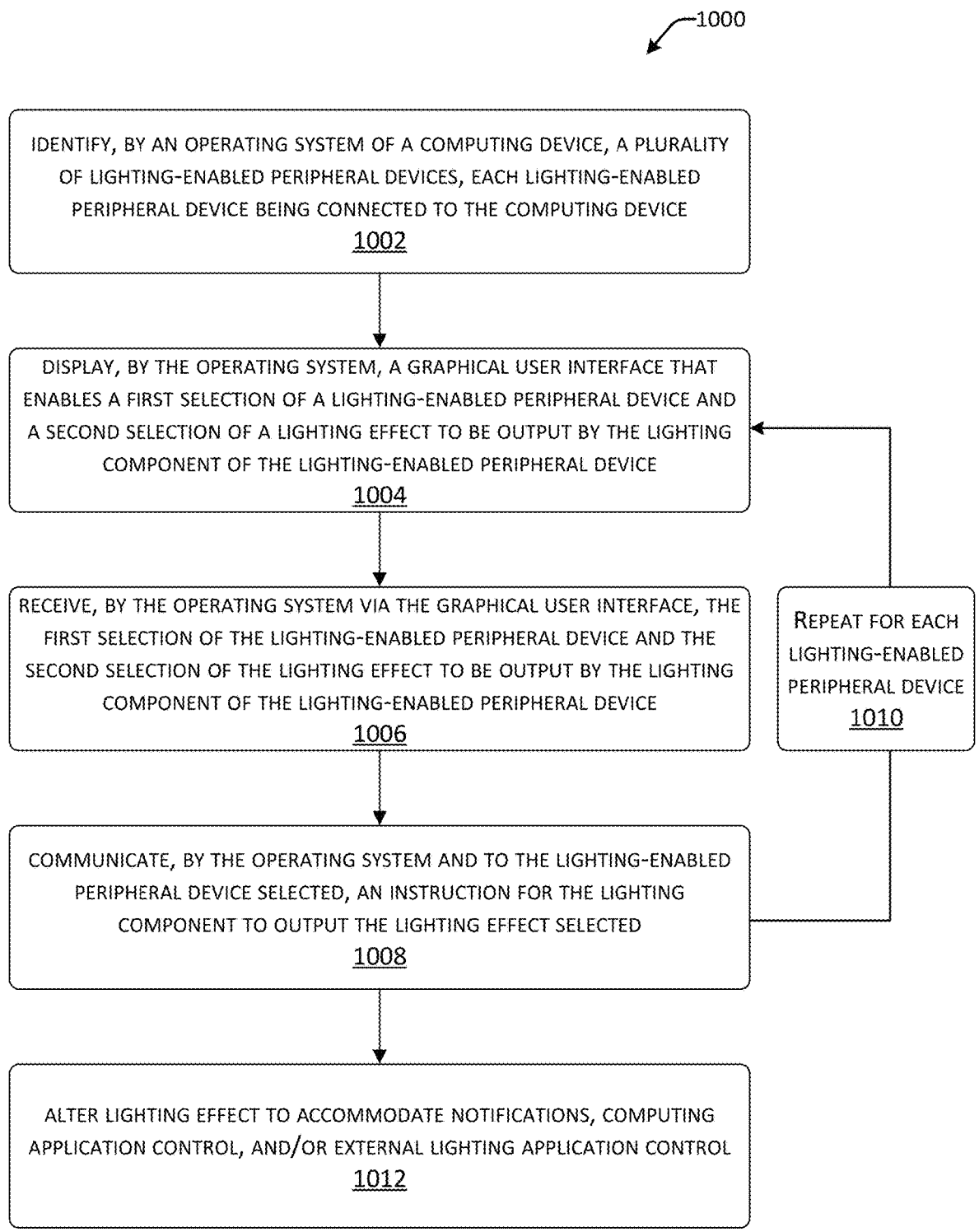
FIG. 10 illustrates a routine for implementing a centralized lighting module to control lighting-enabled peripheral devices connected to a computing device.

FIG. 10 is a flow diagram showing routine 1000 that illustrates aspects of the mechanisms described above with reference to FIGS. 1-9, according to various embodiments disclosed herein. It should be appreciated that the logical operations described herein with regard to FIG. 10 can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in FIG. 10. These operations can also be performed in a different order than those described herein.

For ease of understanding, the process discussed in this disclosure is delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also contemplated that one or more of the provided operations is modified or omitted.

FIG. 10 illustrates a routine for implementing a centralized lighting module to control lighting-enabled peripheral devices connected to a computing device.

The routine 1000 begins at operation 1002, where an operating system identifies a plurality of lighting-enabled peripheral devices connected to a computing device. At operation 1004, the operating system displays a graphical user interface that enables a first selection of a lighting-enabled peripheral device and a second selection of a lighting effect to be output by the lighting component of the lighting-enabled peripheral device. At operation 1006, the operating system receives, via the graphical user interface, the first selection of the lighting-enabled peripheral device and the second selection of the lighting effect to be output by the lighting component of the lighting-enabled peripheral device. At operation 1008, the operating system communicates, to the lighting-enabled peripheral device, an instruction for the lighting component to output the lighting effect selected. As shown, this process can be repeated for each of the lighting-enabled peripheral devices connected to the computing device 1010.

Operation 1012 illustrates how the operating system can alter a baseline or default lighting effect (e.g., ambient light setting) to accommodate a notification, a computing application's control, and/or an external lighting application's control, as described above with respect to FIGS. 4-9.

Figure 11:
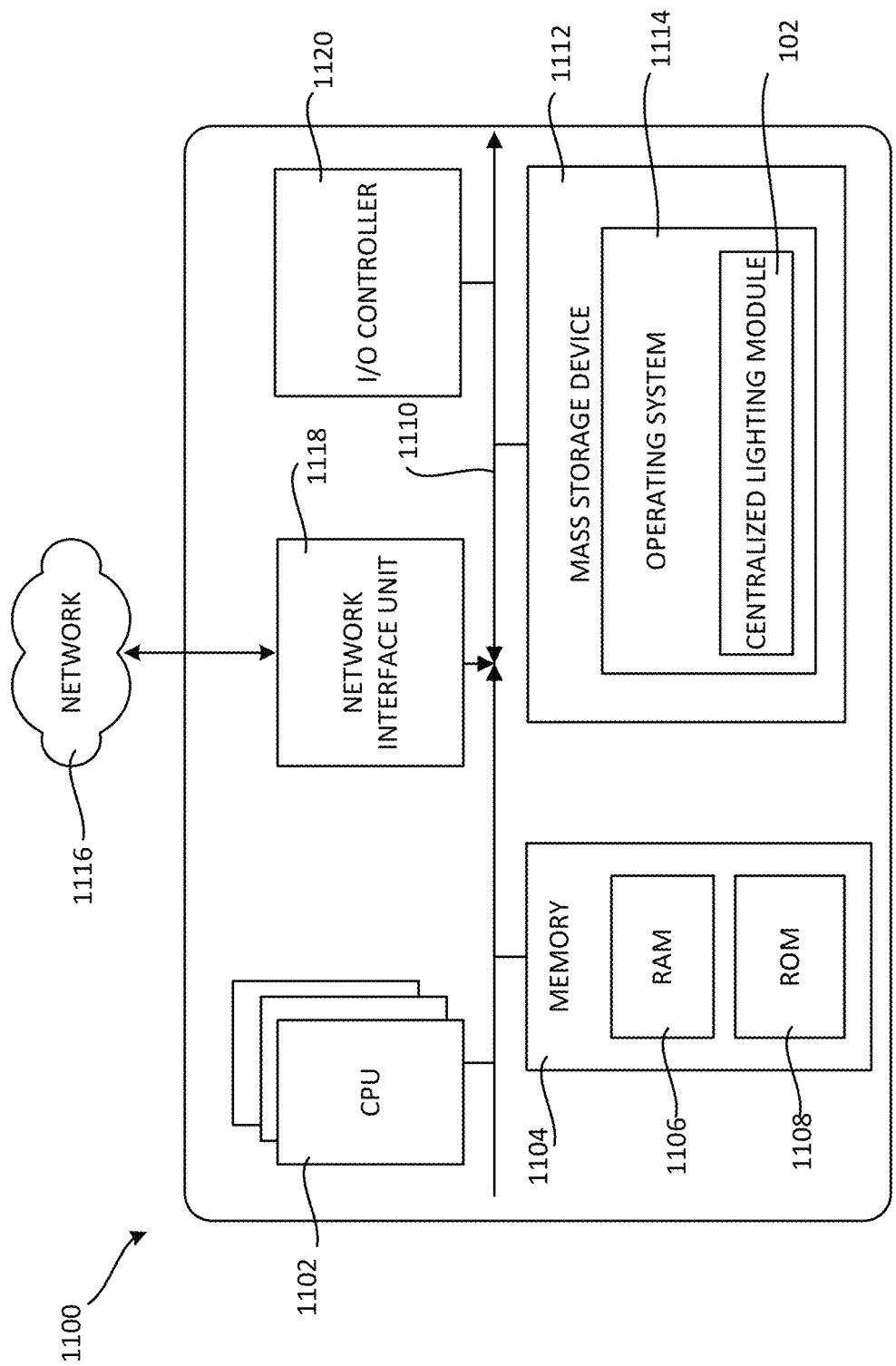
FIG. 11 is a computer architecture diagram showing an illustrative computer hardware and software architecture for a computing device that can implement aspects of the technologies presented herein.

FIG. 11 is a computer architecture diagram showing an illustrative computer hardware and software architecture for a computing device that can implement the various technologies presented herein. In particular, the architecture illustrated in FIG. 11 can be utilized to implement a smartphone device, a tablet device, a laptop device, a desktop device, a server, or another type of computing device 106 capable of connecting and communicating with lighting-enabled peripheral devices 108(1-N).

The computing device 1100 illustrated in FIG. 11 includes a central processing unit 1102 ("CPU"), a system memory 1104, including a random-access memory 1106 ("RAM") and a read-only memory ("ROM") 1108, and a system bus 1110 that couples the memory 1104 to the CPU 1102. A basic input/output system ("BIOS" or "firmware") containing the basic routines that help to transfer information between elements within the computing device 1100, such as during startup, can be stored in the ROM 1108. The computing device 1100 further includes a mass storage device 1112 for storing an operating system 1114 including the centralized lighting module 102, application programs, and/or other types of programs. The mass storage device 1112 can also be configured to store other types of programs and data.

The mass storage device 1112 is connected to the CPU 1102 through a mass storage controller connected to the bus 1110. The mass storage device 1112 and its associated computer readable media provide non-volatile storage for the computing device 1100. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computing device 1100.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computing device 1100. For purposes of the claims, the phrase "computer storage medium," and variations thereof, does not include waves or signals per se or communication media.

According to various configurations, the computing device 1100 can operate in a networked environment using logical connections to remote computers through a network such as the network 1116. The computing device 1100 can connect to the network 1116 through a network interface unit 1118 connected to the bus 1110. It should be appreciated that the network interface unit 1118 can also be utilized to connect to other types of networks and remote computer systems. The computing device 1100 may also include an input/output controller 1120 for receiving and processing input from a number of peripheral devices, such as those described above with respect to FIG. 1. Similarly, the input/output controller 1120 can provide output to a display screen 112 or other type of output device.

It should be appreciated that the software components described herein, when loaded into the CPU 1102 and executed, can transform the CPU 1102 and the overall computing device 1100 from a general-purpose computing device into a special-purpose computing device customized to facilitate the functionality presented herein. The CPU 1102 can be constructed from any number of transistors or other discrete circuit elements, which can individually or collectively assume any number of states. More specifically, the CPU 1102 can operate as a finite-state machine, in response to executable instructions contained within the software modules disclosed herein. These computer-executable instructions can transform the CPU 1102 by specifying how the CPU 1102 transitions between states, thereby transforming the transistors or other discrete hardware elements constituting the CPU 1102.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computing device 1100 in order to store and execute the software components presented herein. It is also contemplated that the computing device 1100 might not include all of the components shown in FIG. 11, can include other components that are not explicitly shown in FIG. 11, or can utilize an architecture completely different than that shown in FIG. 11.

The disclosure presented herein also encompasses the subject matter set forth in the following clauses.

Example Clause A, a method comprising: identifying, by an operating system of a computing device, a plurality of peripheral devices, each peripheral device of the plurality of peripheral devices being connected to the computing device and including a lighting component; displaying, by the operating system, a graphical user interface that enables a first selection of a peripheral device of the plurality of peripheral devices and a second selection of a lighting effect to be output by the lighting component of the peripheral device selected via the first selection; receiving, by the operating system via the graphical user interface, the first selection of the peripheral device and the second selection of the lighting effect to be output by the lighting component of the peripheral device selected via the first selection; and communicating, by the operating system and to the peripheral device selected via the first selection, an instruction for the lighting component to output the lighting effect selected via the second selection.

Example Clause B, the method of Example Clause A, wherein the lighting effect comprises a color for an ambient light setting.

Example Clause C, the method of Example Clause A, wherein the lighting effect comprises a change in color from a first color to a second color to indicate a notification received from an application or a component executing on the computing device.

Example Clause D, the method of Example Clause A, wherein the lighting effect comprises a change in intensity from a first intensity to a second intensity to indicate a notification received from an application or a component executing on the computing device.

Example Clause E, the method of any one of Example Clauses A through D, further comprising: displaying, by the operating system, another graphical user interface that enables a third selection that identifies a computing application approved to control the lighting component of the peripheral device selected via the first selection; receiving, by the operating system via the other graphical user interface, the third selection that identifies the computing application approved to control the lighting component of the peripheral device selected via the first selection; receiving, via an application programming interface of the operating system and from the computing application, a request to control the lighting component of the peripheral device selected via the first selection; and granting, based on the request and the third selection, the computing application temporary control of the lighting component of the peripheral device selected via the first selection.

Example Clause F, the method of any one of Example Clauses A through D, further comprising: displaying, by the operating system, another graphical user interface that enables a third selection of another peripheral device of the plurality of peripheral devices and a fourth selection granting permanent control of the lighting component of the other peripheral device to an external lighting application; receiving, by the operating system via the other graphical user interface, the third selection of the other peripheral device and the fourth selection granting permanent control of the lighting component of the other peripheral device to the external lighting application; and granting, based on the third selection and the fourth selection, the external lighting application permanent control of the lighting component of the other peripheral device.

Example Clause G, the method of any one of Example Clauses A through F, wherein the plurality of peripheral devices are from different manufacturers.

Example Clause H, a computing device comprising: an operating system that includes computer-executable instructions; at least one processor; and a computer-readable storage medium having the computer-executable instructions stored thereupon which, when executed by the at least one processor, cause the operating system of the computing device to perform operations comprising: identifying a plurality of peripheral devices, each peripheral device of the plurality of peripheral devices being connected to the computing device and including a lighting component; displaying a graphical user interface that enables a first selection of a peripheral device of the plurality of peripheral devices and a second selection of a lighting effect to be output by the lighting component of the peripheral device selected via the first selection; receiving, via the graphical user interface, the first selection of the peripheral device and the second selection of the lighting effect to be output by the lighting component of the peripheral device selected via the first selection; and communicating, to the peripheral device selected via the first selection, an instruction for the lighting component to output the lighting effect selected via the second selection.

Example Clause I, the computing device of Example Clause H, wherein the lighting effect comprises a color for an ambient light setting.

Example Clause J, the computing device of Example Clause H, wherein the lighting effect comprises a change in color from a first color to a second color to indicate a notification received from an application or a component executing on the computing device.

Example Clause K, the computing device of Example Clause H, wherein the lighting effect comprises a change in intensity from a first intensity to a second intensity to indicate a notification received from an application or a component executing on the computing device.

Example Clause L, the computing device of any one of Example Clauses H through K, wherein the operations further comprise: displaying another graphical user interface that enables a third selection that identifies a computing application approved to control the lighting component of the peripheral device selected via the first selection; receiving, via the other graphical user interface, the third selection that identifies the computing application approved to control the lighting component of the peripheral device selected via the first selection; receiving, via an application programming interface of the operating system and from the computing application, a request to control the lighting component of the peripheral device selected via the first selection; and granting, based on the request and the third selection, the computing application temporary control of the lighting component of the peripheral device selected via the first selection.

Example Clause M, the computing device of any one of Example Clauses H through K, wherein the operations further comprise: displaying another graphical user interface that enables a third selection of another peripheral device of the plurality of peripheral devices and a fourth selection granting permanent control of the lighting component of the other peripheral device to an external lighting application; receiving, via the other graphical user interface, the third selection of the other peripheral device and the fourth selection granting permanent control of the lighting component of the other peripheral device to the external lighting application; and granting, based on the third selection and the fourth selection, the external lighting application permanent control of the lighting component of the other peripheral device.

Example Clause N, the computing device of any one of Example Clauses H through M, wherein the plurality of peripheral devices are from different manufacturers.

Example Clause O, a computer-readable storage medium having computer-executable instructions stored thereupon which, when executed by at least one processor, cause an operating system of a computing device to perform operations comprising: identifying a plurality of peripheral devices, each peripheral device of the plurality of peripheral devices being connected to the computing device and including a lighting component; displaying a graphical user interface that enables a first selection of a peripheral device of the plurality of peripheral devices and a second selection of a lighting effect to be output by the lighting component of the peripheral device selected via the first selection; receiving, via the graphical user interface, the first selection of the peripheral device and the second selection of the lighting effect to be output by the lighting component of the peripheral device selected via the first selection; and communicating, to the peripheral device selected via the first selection, an instruction for the lighting component to output the lighting effect selected via the second selection.

Example Clause P, the computer-readable storage medium of Example Clause O, wherein the lighting effect comprises a color for an ambient light setting.

Example Clause Q, the computer-readable storage medium of Example Clause O, wherein the lighting effect comprises a change in color from a first color to a second color to indicate a notification received from an application or a component executing on the computing device.

Example Clause R, the computer-readable storage medium of Example Clause O, wherein the lighting effect comprises a change in intensity from a first intensity to a second intensity to indicate a notification received from an application or a component executing on the computing device.

Example Clause S, the computer-readable storage medium of any one of Example Clauses O through R, wherein the operations further comprise: displaying another graphical user interface that enables a third selection that identifies a computing application approved to control the lighting component of the peripheral device selected via the first selection; receiving, via the other graphical user interface, the third selection that identifies the computing application approved to control the lighting component of the peripheral device selected via the first selection; receiving, via an application programming interface of the operating system and from the computing application, a request to control the lighting component of the peripheral device selected via the first selection; and granting, based on the request and the third selection, the computing application temporary control of the lighting component of the peripheral device selected via the first selection.

Example Clause T, the computer-readable storage medium of any one of Example Clauses O through R, wherein the operations further comprise: displaying another graphical user interface that enables a third selection of another peripheral device of the plurality of peripheral devices and a fourth selection granting permanent control of the lighting component of the other peripheral device to an external lighting application; receiving, via the other graphical user interface, the third selection of the other peripheral device and the fourth selection granting permanent control of the lighting component of the other peripheral device to the external lighting application; and granting, based on the third selection and the fourth selection, the external lighting application permanent control of the lighting component of the other peripheral device.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different peripheral devices, two different selections).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. All examples are provided for illustrative purposes and is not to be construed as limiting.

What is claimed is:

1. A method comprising:
    identifying, by an operating system of a computing device, a plurality of peripheral devices, wherein:
        a first peripheral device of the plurality of peripheral devices is from a first manufacturer;
        a second peripheral device of the plurality of peripheral devices is from a second manufacturer that is different than the first manufacturer; and
        each peripheral device of the plurality of peripheral devices is connected to the computing device and includes a lighting component;
    displaying, by the operating system, a graphical user interface that enables a first selection of a peripheral device of the plurality of peripheral devices and a second selection of a lighting effect to be output by the lighting component of the peripheral device selected via the first selection;
    receiving, by the operating system via the graphical user interface, the first selection of the peripheral device and the second selection of the lighting effect to be output by the lighting component of the peripheral device selected via the first selection; and
    communicating, by the operating system and to the peripheral device selected via the first selection, an instruction for the lighting component to output the lighting effect selected via the second selection.

2. The method of claim 1, wherein the lighting effect comprises a color for an ambient light setting.

3. The method of claim 1, wherein the lighting effect comprises a change in color from a first color to a second color to indicate a notification received from an application or a component executing on the computing device.

4. The method of claim 1, wherein the lighting effect comprises a change in intensity from a first intensity to a second intensity to indicate a notification received from an application or a component executing on the computing device.

5. The method of claim 1, further comprising:
displaying, by the operating system, another graphical user interface that enables a third selection that identifies a computing application approved to control the lighting component of the peripheral device selected via the first selection;
receiving, by the operating system via the other graphical user interface, the third selection that identifies the computing application approved to control the lighting component of the peripheral device selected via the first selection;
receiving, via an application programming interface of the operating system and from the computing application, a request to control the lighting component of the peripheral device selected via the first selection; and
granting, based on the request and the third selection, the computing application temporary control of the lighting component of the peripheral device selected via the first selection.

6. The method of claim 1, further comprising:
displaying, by the operating system, another graphical user interface that enables a third selection of another peripheral device of the plurality of peripheral devices and a fourth selection granting permanent control of the lighting component of the other peripheral device to an external lighting application;
receiving, by the operating system via the other graphical user interface, the third selection of the other peripheral device and the fourth selection granting permanent control of the lighting component of the other peripheral device to the external lighting application; and
granting, based on the third selection and the fourth selection, the external lighting application permanent control of the lighting component of the other peripheral device.

7. A computing device comprising:
an operating system that includes computer-executable instructions;
at least one processor; and
a computer-readable storage medium having the computer-executable instructions stored thereupon which, when executed by the at least one processor, cause the operating system of the computing device to perform operations comprising:
identifying a plurality of peripheral devices, wherein:
a first peripheral device of the plurality of peripheral devices is from a first manufacturer;
a second peripheral device of the plurality of peripheral devices is from a second manufacturer that is different than the first manufacturer; and
each peripheral device of the plurality of peripheral devices is connected to the computing device and includes a lighting component;
displaying a graphical user interface that enables a first selection of a peripheral device of the plurality of peripheral devices and a second selection of a lighting effect to be output by the lighting component of the peripheral device selected via the first selection;
receiving, via the graphical user interface, the first selection of the peripheral device and the second selection of the lighting effect to be output by the lighting component of the peripheral device selected via the first selection; and
communicating, to the peripheral device selected via the first selection, an instruction for the lighting component to output the lighting effect selected via the second selection.

8. The computing device of claim 7, wherein the lighting effect comprises a color for an ambient light setting.

9. The computing device of claim 7, wherein the lighting effect comprises a change in color from a first color to a second color to indicate a notification received from an application or a component executing on the computing device.

10. The computing device of claim 7, wherein the lighting effect comprises a change in intensity from a first intensity to a second intensity to indicate a notification received from an application or a component executing on the computing device.

11. The computing device of claim 7, wherein the operations further comprise:
displaying another graphical user interface that enables a third selection that identifies a computing application approved to control the lighting component of the peripheral device selected via the first selection;
receiving, via the other graphical user interface, the third selection that identifies the computing application approved to control the lighting component of the peripheral device selected via the first selection;
receiving, via an application programming interface of the operating system and from the computing application, a request to control the lighting component of the peripheral device selected via the first selection; and
granting, based on the request and the third selection, the computing application temporary control of the lighting component of the peripheral device selected via the first selection.

12. The computing device of claim 7, wherein the operations further comprise:
displaying another graphical user interface that enables a third selection of another peripheral device of the plurality of peripheral devices and a fourth selection granting permanent control of the lighting component of the other peripheral device to an external lighting application;
receiving, via the other graphical user interface, the third selection of the other peripheral device and the fourth selection granting permanent control of the lighting component of the other peripheral device to the external lighting application; and
granting, based on the third selection and the fourth selection, the external lighting application permanent control of the lighting component of the other peripheral device.

13. A computer-readable storage medium having computer-executable instructions stored thereupon which, when executed by at least one processor, cause an operating system of a computing device to perform operations comprising:
identifying a plurality of peripheral devices, wherein:
a first peripheral device of the plurality of peripheral devices is from a first manufacturer;
a second peripheral device of the plurality of peripheral devices is from a second manufacturer that is different than the first manufacturer; and
each peripheral device of the plurality of peripheral devices is connected to the computing device and including a lighting component;
displaying a graphical user interface that enables a first selection of a peripheral device of the plurality of peripheral devices and a second selection of a lighting effect to be output by the lighting component of the peripheral device selected via the first selection;

receiving, via the graphical user interface, the first selection of the peripheral device and the second selection of the lighting effect to be output by the lighting component of the peripheral device selected via the first selection; and communicating, to the peripheral device selected via the first selection, an instruction for the lighting component to output the lighting effect selected via the second selection.

14. The computer-readable storage medium of claim 13, wherein the lighting effect comprises a color for an ambient light setting.

15. The computer-readable storage medium of claim 13, wherein the lighting effect comprises a change in color from a first color to a second color to indicate a notification received from an application or a component executing on the computing device.

16. The computer-readable storage medium of claim 13, wherein the lighting effect comprises a change in intensity from a first intensity to a second intensity to indicate a notification received from an application or a component executing on the computing device.

17. The computer-readable storage medium of claim 13, wherein the operations further comprise:

displaying another graphical user interface that enables a third selection that identifies a computing application approved to control the lighting component of the peripheral device selected via the first selection;

receiving, via the other graphical user interface, the third selection that identifies the computing application approved to control the lighting component of the peripheral device selected via the first selection;

receiving, via an application programming interface of the operating system and from the computing application, a request to control the lighting component of the peripheral device selected via the first selection; and granting, based on the request and the third selection, the computing application temporary control of the lighting component of the peripheral device selected via the first selection.

18. The computer-readable storage medium of claim 13, wherein the operations further comprise:

displaying another graphical user interface that enables a third selection of another peripheral device of the plurality of peripheral devices and a fourth selection granting permanent control of the lighting component of the other peripheral device to an external lighting application;

receiving, via the other graphical user interface, the third selection of the other peripheral device and the fourth selection granting permanent control of the lighting component of the other peripheral device to the external lighting application; and granting, based on the third selection and the fourth selection, the external lighting application permanent control of the lighting component of the other peripheral device.

* * * * *